United States Patent
Prasad et al.

(10) Patent No.: US 12,399,772 B2
(45) Date of Patent: *Aug. 26, 2025

(54) DEVICES, SYSTEMS, AND METHODS FOR DETECTING AND MITIGATING SILENT DATA CORRUPTIONS VIA ADAPTIVE VOLTAGE-FREQUENCY SCALING

(71) Applicant: Advanced Micro Devices, Inc., Santa Clara, CA (US)

(72) Inventors: Divya Madapusi Srinivas Prasad, Santa Clara, CA (US); Sudhanva Gurumurthi, Austin, TX (US); Yasuko Eckert, Bellevue, WA (US); Jeffrey Richard Rearick, Ft Collins, CO (US); Sankaranarayanan Gurumurthy, Austin, TX (US); Amitabh Mehra, Ft. Collins, CO (US); Shidhartha Das, Milton Keynes (GB); Alex W. Schaefer, Austin, TX (US); Vikram Ramachandra, Austin, TX (US); Vilas Sridharan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,417

(22) Filed: Apr. 3, 2024

(65) Prior Publication Data
US 2024/0264900 A1 Aug. 8, 2024

Related U.S. Application Data

(63) Continuation of application No. 18/072,650, filed on Nov. 30, 2022, now Pat. No. 11,966,283.

(51) Int. Cl.
*G06F 11/07* (2006.01)
*G06F 1/30* (2006.01)

(52) U.S. Cl.
CPC .......... *G06F 11/0793* (2013.01); *G06F 11/07* (2013.01); *G06F 1/30* (2013.01); *G06F 11/0721* (2013.01)

(58) Field of Classification Search
CPC .............................. G06F 11/0793; G06F 11/07
See application file for complete search history.

(56) References Cited

U.S. PATENT DOCUMENTS

| | | | |
|---|---|---|---|
| 6,282,071 B1 * | 8/2001 | Jackson | H02M 1/32 361/91.1 |
| 7,065,690 B1 * | 6/2006 | Yoshida | G06F 30/398 714/724 |

(Continued)

OTHER PUBLICATIONS

Harish Dattatraya Dixit, Sneha Pendharkar, Matt Beadon, Chris Mason, Tejasvi Chakravarthy, Bharath Muthiah, Sriram Sankar; Silent Data Corruptions at Scale;I arXiv:2102.11245 [cs.AR]; Feb. 22, 2021 (Year: 2021).*

(Continued)

*Primary Examiner* — Joseph D Torres
(74) *Attorney, Agent, or Firm* — Greenberg Traurig, LLP (57) ABSTRACT

An exemplary computing device includes a plurality of circuits and/or a plurality of in-situ monitors configured to generate outputs that indicate one or more operating conditions of the circuits. The computing device also includes a system management unit configured to detect a potentially faulty voltage-to-frequency ratio implemented by one of the circuits based at least in part on one or more of the outputs. The system management unit is also configured to modify the potentially faulty voltage-to-frequency ratio based at least in part on one or more of the outputs. Various other devices, systems, and methods are also disclosed.

20 Claims, 5 Drawing Sheets

(56) References Cited

U.S. PATENT DOCUMENTS

| | | | |
|---|---|---|---|
| 9,760,672 B1 | 9/2017 | Taneja et al. | |
| 2004/0083410 A1* | 4/2004 | Cutter | G06F 11/263 |
| | | | 714/57 |
| 2015/0091582 A1* | 4/2015 | Wei | G01R 31/52 |
| | | | 324/509 |
| 2022/0302747 A1* | 9/2022 | Colby, Jr. | H02J 9/062 |

OTHER PUBLICATIONS

Harish Dattatraya Dixit, Sneha Pendharkar, Matt Beadon, Chris Mason, Tejasvi Chakravarthy, Bharath Muthiah, Sriram Sankar; Silent Data Corruptions at Scale; arXiv:2102. 11245 [cs.AR]; Feb. 22, 2021 (8 pages).

Peter H. Hochschild, Paul Turner, Jeffrey C. Mogul, Rama Govindaraju, Parthasarathy Ranganathan, David E. Culler, and Amin Vahdat; "Cores that don't count"; In Workshop on Hot Topics in Operating Systems (HotOS '21), May 31-Jun. 2, 2021, Ann Arbor; https://doi.org/10.1145/3458336.3465297 (8 pages).

Dan Ernst, Nam Sung Kim, Shidhartha Das, Sanjay Pant, Rajeev Rao, Toan Pham, Comad Ziesler, David Blaauw, Todd Austin, Krisztian Flautner 1, and Trevor Mudge, "Razor: A Low-Power Pipeline Based on Circuit-Level Timing Speculation" URL: https://www-users-cse.umn.edu/~zhai/courses/5980/readings/lec8/razor.pdf; published on Dec. 2023, (12 pages).

Kulkarni et al., "A 409 GPS/W Adaptive and Resilient Domino Register File in 22 nm Tri-Gate CMOS Featuring In-Situ Timing Margin and Error Detection for Tolerance to Within-Die Variation, Voltage Droop, Temperature and Aging", URL: https://sites.utexas.edu/CRL/files/2018/11/2_JSSC_2016_Resilient_RF.pdf; IEEE, Journal of Solid-State Circuits, vol. 51, No. 1, published on Jan. 1, 2016, pp. 117-129.

* cited by examiner

DEVICES, SYSTEMS, AND METHODS FOR DETECTING AND MITIGATING SILENT DATA CORRUPTIONS VIA ADAPTIVE VOLTAGE-FREQUENCY SCALING

CROSS REFERENCE TO RELATED APPLICATION

This application is a continuation of U.S. application Ser. No. 18/072,650 filed 30 Nov. 2022, the disclosure of which is incorporated in its entirety by this reference.

BACKGROUND

Silent data corruptions are a problem that spans the high-technology industry. A silent data corruption is a computing error that renders incorrect data. For example, a silent data corruption can result from an add operation in which the sum does not correctly match the addition of multiple inputs (e.g., 1+1=3). In some examples, silent data corruptions can occur due to timing errors that propagate throughout a computing device. The instant disclosure identifies and addresses a need for additional and improved devices, systems, and methods for detecting and mitigating silent data corruptions.

BRIEF DESCRIPTION OF THE DRAWINGS

The accompanying drawings illustrate a number of exemplary implementations and are a part of the specification. Together with the following description, these drawings demonstrate and explain various principles of the instant disclosure.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the instant disclosure covers all modifications, equivalents, and alternatives falling within the scope of the appended claims.

DETAILED DESCRIPTION OF EXEMPLARY IMPLEMENTATIONS

The present disclosure describes various devices, systems, and methods for detecting and/or mitigating silent data corruptions via adaptive voltage-frequency scaling (AVFS). Silent data corruptions can occur as a result of timing errors propagating through a computing device. In some examples, as will be described in greater detail below, a solution for detecting, mitigating, and/or correcting these silent data corruptions can involve double sampling data paths for timing errors via in-situ monitors (e.g., razor flops). In such examples, these razor flops can be distributed across various points (e.g., different processor cores and/or caches) of a computing device and can report timing errors to a system management unit running on the computing device.

In some examples, the system management unit can record and/or analyze operating conditions (e.g., relevant temperatures, voltages, and/or frequencies) of the monitored points within the computing device as additional telemetry data in connection with such timing errors. Additionally or alternatively, the system management unit can implement an a-priori prediction mechanism based on certain simulations (e.g., Monte Carlo simulations) of the computing device to assess parameters of the computing device when silent data corruptions occur. In one example, the system management unit can evaluate all the telemetry data (e.g., timing data and/or reports, temperature, voltage, frequency, etc.) collected throughout the computing device and detect silent data corruptions based at least in part on such telemetry data. In this example, the system management unit can then mitigate the silent data corruptions by modifying the voltage-frequency curve for one or more features or regions (e.g., specific processor cores and/or caches) of the computing device. For example, the system management unit can increase the voltage of an error-prone feature or region and/or decrease the frequency of the clock running on such a feature or region.

By increasing the voltage of an error-prone feature or region and/or decreasing the frequency of the clock running on such a feature or region, the system management unit can mitigate and/or prevent the occurrence of silent data corruptions in that feature or region via AVFS. In some examples, this sort of detection and/or mitigation can occur a-priori in a quality-control lab prior to shipping and/or releasing a specific computing device. In other examples, this sort of detection and/or mitigation can occur at runtime and/or in the field after a specific computing device has been deployed for use by a customer.

In some examples, this sort of detection and/or mitigation can be performed on a system-level and/or a region-level. For example, if silent data corruptions are likely widespread throughout a computing device, the system management unit can increase the voltage and/or decrease the clock frequencies across most or all of the features or regions (e.g., all processor cores and/or caches) of the computing device. In another example, if silent data corruptions are likely limited to one or two features or regions (e.g., a select few processor cores and/or caches) of a computing device, the system management unit can increase the voltage and/or decrease the frequency of clock(s) only for those features or regions of the computing device. In this example, the voltage and/or frequency at the other features or regions of the computing device can remain unaffected and/or unchanged.

By doing so, the system management unit can optimize and/or maximize the performance of the computing device relative to the power consumption of the computing device. In other words, the system management unit can push the performance of the computing device to the cusp of failure (e.g., where silent data corruptions occur) and/or reduce the power consumption to the cusp of failure without compromising the computing device's dependability and/or reliability. Moreover, these performance and/or power modifications can be made dynamically and/or predictively at any point and/or multiple times throughout the lifetime of the computing device.

In some examples, a computing device includes and/or represents a plurality of circuits and/or a plurality of in-situ monitors configured to generate outputs that indicate one or more operating conditions of the circuits. In such examples, the computing device also includes and/or represents a system management unit configured to detect a potentially faulty voltage-to-frequency ratio implemented by one of the circuits based at least in part on one or more of the outputs. In one example, the system management unit is also configured to modify the potentially faulty voltage-to-frequency ratio based at least in part on one or more of the outputs.

In some examples, the operating conditions indicated by the outputs can include and/or represent voltage levels of the circuits, frequencies of oscillating signals used by the circuits, temperatures of the circuits, and/or potential timing errors experienced by the circuits. Additionally or alternatively, the circuits can each include and/or represent one or more processor cores and/or memory devices (e.g., caches).

In some examples, the in-situ monitors can be positioned to monitor various features and/or regions of the computing device, including a critical path of one of the circuits, an auxiliary path that simulates a critical path of one of the circuits, a power supply voltage of one of the circuits, a temperature of one of the circuits, a frequency of an oscillating signal used by one of the circuits, potential timing errors experienced by one of the circuits, combinations of one or more of the same, and/or any other suitable feature or region.

In some examples, the system management unit is further configured to detect a data corruption event indicative of the potentially faulty voltage-to-frequency ratio by sampling data traversing the one of the circuits at a plurality of nodes within the circuits and then comparing the data sampled at one of the nodes with the data sampled at another one of the nodes. In one example, system management unit is further configured to detect a clock delay indicative of a timing error that causes the data corruption event by sampling the data with both a reference oscillating signal and a delayed oscillating signal. Additionally or alternatively, the system management unit is further configured to record the operating conditions indicated by the outputs in response to detecting the clock delay and/or modify the potentially faulty voltage-to-frequency ratio based at least in part on one or more of the operating conditions recorded in response to detecting the clock delay. In certain implementations, the operating conditions recorded in response to detecting the clock delay represent a state of the one of the circuits when the timing error occurred.

In some examples, one or more of the in-situ monitors include and/or represent a razor flip-flop incorporated in the one of the circuits. In such examples, the razor flip-flop generates and/or produces an output indicative of whether the one of the circuits experiences a timing error. In one example, the system management unit is further configured to increase a voltage level of the one of the circuits and/or decrease a frequency of an oscillating signal used by the one of the circuits. Additionally or alternatively, the system management unit is further configured to maintain another voltage-to-frequency ratio implemented by another one of the circuits despite modifying the potentially faulty voltage-to-frequency ratio.

In some examples, the system management unit is further configured to analyze the one or more of the outputs and/or predict that the voltage-to-frequency ratio is potentially faulty based at least in part on the analysis of the one or more of the outputs. In one example, the system management unit is further configured to tolerate at least one data corruption event before modifying the potentially faulty voltage-to-frequency ratio, detect a plurality of data corruption events in connection with the one of the circuits, and/or modify the potentially faulty voltage-to-frequency ratio in response to detecting the plurality of data corruption events. Additionally or alternatively, the system management unit is further configured to detect another potentially faulty voltage-to-frequency ratio implemented by another one of the circuits based at least in part on one or more of the outputs and/or modify the another potentially faulty voltage-to-frequency ratio based at least in part on one or more of the outputs.

In some examples, a system includes and/or represents a computing device and/or a processor incorporated in the computing device. In such examples, the processor includes and/or represents a plurality of circuits and/or a plurality of in-situ monitors configured to generate outputs that indicate one or more operating conditions of the circuits. In one example, the processor also includes and/or represents a system management unit configured to detect a potentially faulty voltage-to-frequency ratio implemented by one of the circuits based at least in part on one or more of the outputs and/or modify the potentially faulty voltage-to-frequency ratio based at least in part on one or more of the outputs.

In some examples, a method includes and/or involves creating a plurality of circuits and/or configuring a plurality of in-situ monitors to generate outputs that indicate one or more operating conditions of the circuits. In such examples, the method also includes and/or involves configuring a system management unit to detect a potentially faulty voltage-to-frequency ratio implemented by one of the circuits based at least in part on one or more of the outputs and/or modify the potentially faulty voltage-to-frequency ratio based at least in part on one or more of the outputs.

The following will provide, with reference to FIGS. 1-4, detailed descriptions of exemplary apparatuses, devices, systems, and/or corresponding implementations for detecting and/or mitigating silent data corruptions via AVFS. Detailed descriptions of an exemplary method for detecting and/or mitigating silent data corruptions via AVFS will be provided in connection with FIG. 5.

Figure 1:
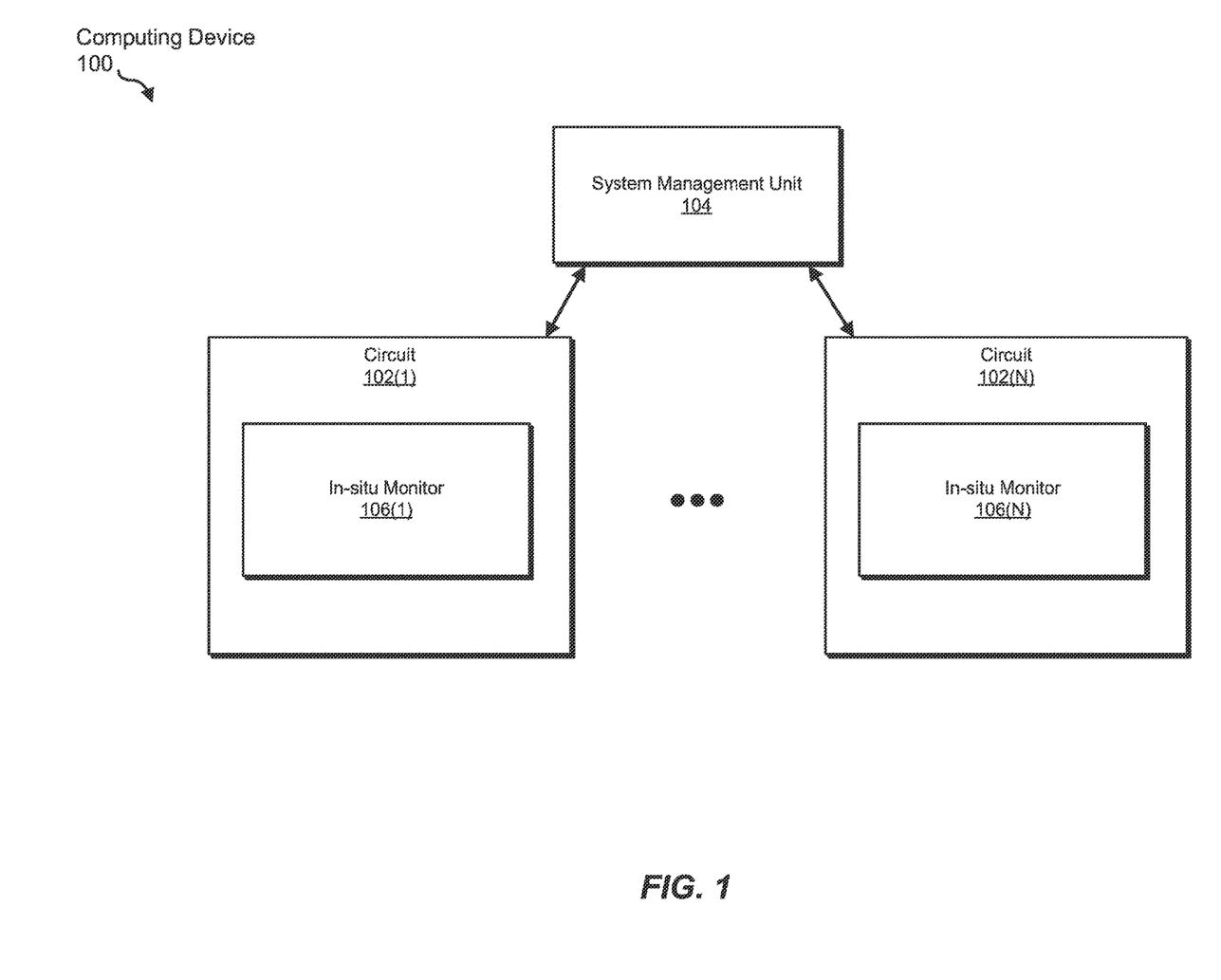
FIG. 1 is a block diagram of a computing device capable of detecting and/or mitigating silent data corruptions via adaptive voltage-frequency scaling (AVFS) according to one or more implementations of this disclosure.

FIG. 1 illustrates a portion of an exemplary computing device 100 capable of detecting and/or mitigating silent data corruptions via AVFS. As illustrated in FIG. 1, exemplary computing device 100 includes and/or represents various circuits, features, and/or regions that are monitored for evidence of silent data corruptions and/or corresponding operating conditions. For example, computing device 100 can include and/or represent circuits 102(1)-(N) and/or a system management unit 104. In this example, circuits 102(1)-(N) and system management unit 104 can be electrically and/or communicatively coupled to one another. In certain implementations, in-situ monitors 106(1)-(N) are incorporated in, implemented in, and/or communicatively coupled to circuits 102(1)-(N), respectively.

In some examples, in-situ monitors 106(1)-(N) generate, produce, and/or render outputs that indicate one or more operating conditions of circuits 102(1)-(N). Examples of such operating conditions include, without limitation, voltage levels of circuits 102(1)-(N), frequencies of oscillating signals used by circuits 102(1)-(N), temperatures of circuits 102(1)-(N), potential timing errors experienced by the circuits 102(1)-(N), combinations or variations of one or more of the same, and/or any other suitable operating conditions.

In some examples, system management unit 104 detects and/or senses a potentially faulty voltage-to-frequency ratio implemented by one or more of circuits 102(1)-(N) based at least in part on one or more of the outputs from in-situ monitors 106(1)-(N). In one example, the term "potentially faulty voltage-to-frequency ratio" corresponds to and/or represents a relationship and/or association between the voltage level of a circuit and the clock frequency of the circuit that is likely to lead to silent data corruptions. For example, one or more of circuits 102(1)-(N) can operate at approximately 3.3 volts with a clock frequency of approximately 2 gigahertz. In this example, if this combination of 3.3 volts and 2-gigahertz clock causes or is likely to cause silent data corruptions in one of circuits 102(1)-(N), then this combination constitutes and/or represents a potentially faulty voltage-to-frequency ratio for that circuit.

In some examples, in-situ monitors 106(1)-(N) can be applied and/or inserted at different points, such as select critical paths, of computing device 100. In one example, in-situ monitors 106(1)-(N) can perform multi-sampling of data (e.g., double, triple, and/or quadruple sampling of data) traversing circuits 102(1)-(N) with expected clocks and delayed clocks to detect, flag, and/or catch timing errors. In this example, in-situ monitors 106(1)-(N) can then notify system management unit 104 of any timing errors detected and/or flagged in the select critical paths.

In some examples, system management unit 104 modifies, adjusts, and/or changes the potentially faulty voltage-to-frequency ratio based at least in part on one or more of the outputs from in-situ monitors 106(1)-(N). To do so, system management unit 104 can increase and/or increment the supply voltage of one or more of circuits 102(1)-(N). Additionally or alternatively, system management unit 104 can decrease and/or decrement the frequency of the clock on which one or more of circuits 102(1)-(N) is running and/or operating. By doing so, system management unit 104 can stabilize and/or optimize the performance and/or power consumption of computing device 100 to avoid silent data corruptions without compromising the dependability and/or reliability of computing device 100.

System management unit 104 can update the voltage-to-frequency ratio in a variety of ways and/or contexts. In one example, computing device 100 can implement and/or provide embedded replica circuits (e.g., critical path oscillators) to simulate and/or match the behavior of certain circuits (e.g., processors, caches, and/or cores). In this example, system management unit 104 can implement and/or perform a binary search and/or a proportional integral-derivative (PID) control loop to discover and/or derive the voltage-to-frequency ratio of a certain circuit by sweeping the corresponding operating conditions of the replica circuit.

In some examples, computing device 100 can include and/or represent any type or form of hardware-implemented device, system, and/or component capable of storing and/or executing computer-readable instructions. Examples of computing device 100 include, without limitation, processors, SoCs, Central Processing Units (CPUs), Graphical Processing Units (GPUs), microprocessors, microcontrollers, Field-Programmable Gate Arrays (FPGAs), Application-Specific Integrated Circuits (ASICs), laptops, computers, desktops, servers, network devices, routers, switches, gateways, combinations or variations of one or more of the same, and/or any other type of suitable computing device.

In some examples, system management unit 104 tracks the number and/or frequency of silent data corruptions across circuits 102(1)-(N). In one example, if the number or frequency of silent data corruptions exceeds a certain threshold (e.g., more than one silent data corruption), system management unit 104 updates the voltage-to-frequency ratio by increasing the voltage and/or decreasing the frequency to tailor down the performance for the sake of dependability and/or reliability. Additionally or alternatively, system management unit 104 can track the age of computing device 100 to account for its age in certain updates to the voltage-to-frequency ratio. For example, system management unit 104 can compensate and/or account for aging of the hardware using a-priori aging simulations and/or monitors. By doing so, system management unit 104 can anticipate certain behavioral and/or performance changes that occur as the hardware ages to avoid repeat silent data corruptions in computing device 100.

In some examples, circuits 102(1)-(N) each include and/or represent a hardware component and/or circuitry implemented in computing device 100. In such examples, circuits 102(1)-(N) can include and/or represent analog and/or digital circuitry with combinations of transistors, resistors, capacitors, diodes, inductors, switches, registers, flip-flops, connections, traces, buses, semiconductor (e.g., silicon) devices and/or structures, logic gates, multiplexers (MUXes), circuit boards, clock generators, combinations or variations of one or more of the same, and/or any other suitable components and/or features of a computing device. In one example, some of circuits 102(1)-(N) can include and/or represent processor cores, and others of circuits 102(1)-(N) can include and/or represent memory devices. As a specific example, computing device 100 can include and/or represent an SoC, and circuits 102(1)-(N) can include and/or represent various CPU cores and/or various Level 3 (L3) caches disposed on and/or implemented in the SoC.

Figure 2:
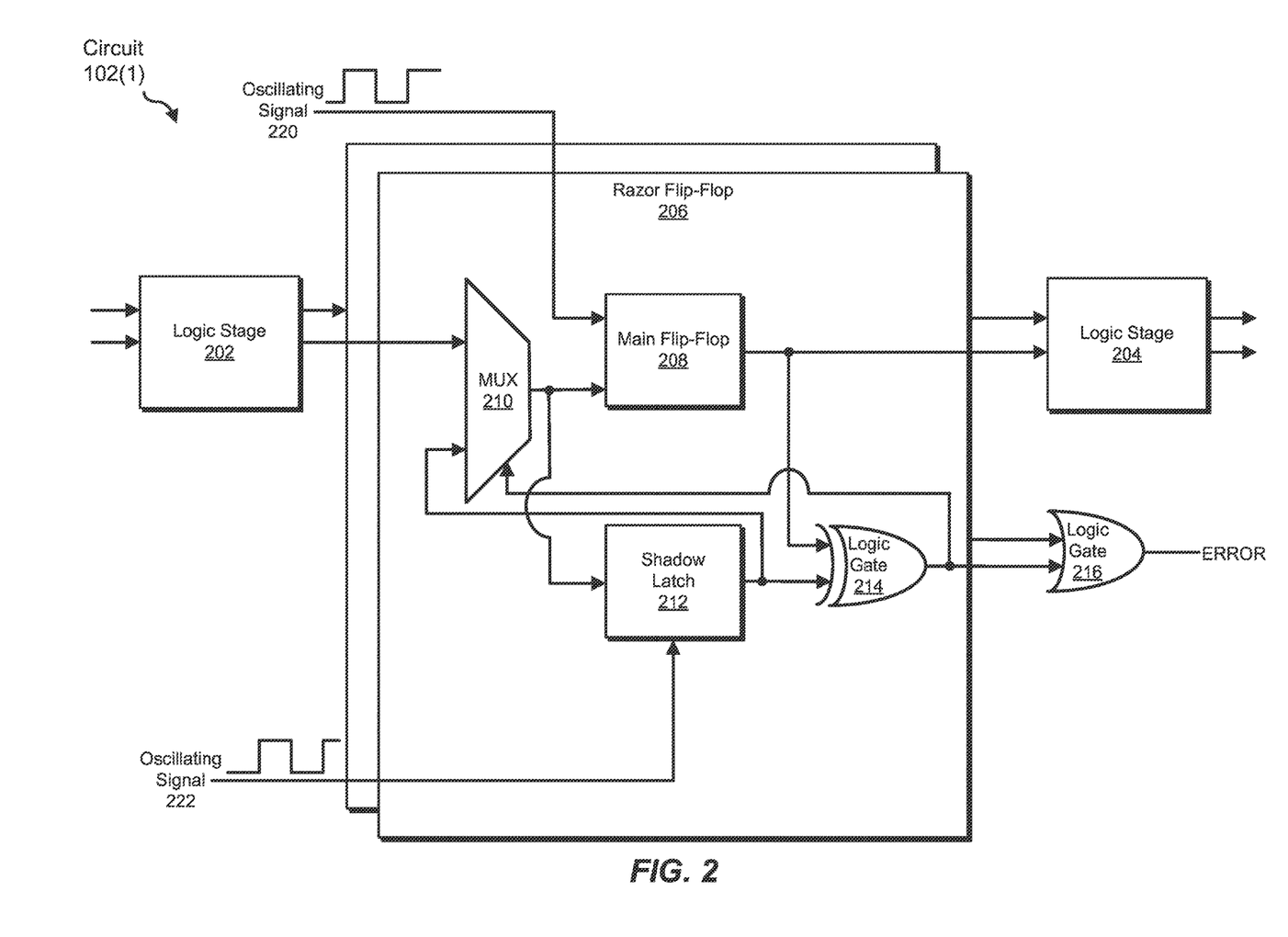
FIG. 2 is a circuit diagram of a circuit capable of monitoring operating conditions indicative of a potentially faulty voltage-to-frequency ratio according to one or more implementations of this disclosure.

In some examples, in-situ monitors 106(1)-(N) each include and/or represent a hardware component, sensor, and/or circuitry (e.g., a ring oscillator) implemented in and/or communicatively coupled to one of circuits 102(1)-(N). In one example, one or more of in-situ monitors 106(1)-(N) can include and/or represent a razor flip-flop (as illustrated in FIG. 2) whose output indicates a potential timing error and/or a clock delay capable of causing a data corruption event. Additionally or alternatively, one or more of in-situ monitors 106(1)-(N) can include and/or represent a temperature-dependent ring oscillator that generates an oscillating signal whose frequency changes based upon the temperature of the corresponding circuit and/or site. In certain implementations, one or more of in-situ monitors 106(1)-(N) can include and/or represent a power-supply monitoring ring oscillator that generates an oscillating signal whose frequency changes based upon the voltage level of the supply voltage at the corresponding circuit and/or site. In other implementations, one or more of in-situ monitors 106(1)-(N) can include and/or represent a critical path oscillator and/or emulator that generates an oscillating signal whose frequency models and/or indicates the voltage-to-frequency ratio present at the corresponding circuit and/or site.

In some examples, in-situ monitors 106(1)-(N) can be positioned, configured, and/or implemented to monitor various features and/or regions of computing device 100, including critical paths of circuits 102(1)-(N), auxiliary paths that simulates critical paths of circuits 102(1)-(N), supply voltages of circuits 102(1)-(N), temperatures of circuits 102(1)-(N), frequencies of oscillating signals used by circuits 102(1)-(N), potential timing errors experienced by circuits 102

(1)-(N), combinations or variations of one or more of the same, and/or any other suitable features and/or regions.

FIG. 2 illustrates an exemplary implementation of circuit 102(1) capable of detecting and/or mitigating silent data corruptions via AVFS. As illustrated in FIG. 2, exemplary circuit 102(1) includes and/or represents logic stage 202, logic stage 204, and/or a razor flip-flop 206. In some examples, circuit 102(1) can include and/or represent certain components and/or features that perform and/or provide functionalities that are similar and/or identical to those described above in connection with FIG. 1. In one example, razor flip-flop 206 is electrically and/or communicatively coupled between logic stages 202 and 204. Although not necessarily labelled in FIG. 2, circuit 102(1) can also include and/or represent one or more additional razor flip-flops in parallel with razor flip-flop 206 between logic stages 202 and 204.

In some examples, razor flip-flop 206 constitutes and/or represents all or part of in-situ monitor 106(1) implemented in and/or communicatively coupled to circuit 102(1). In one example, razor flip-flop 206 includes and/or represents a MUX 210, a main flip-flop 208, a shadow latch 212, and/or a logic gate 214. In this example, the output of MUX 210 is electrically and/or communicatively coupled to an input of main flip-flop 208 and/or an input of shadow latch 212, and the output of main flip-flop 208 is electrically and/or communicatively coupled to an input of logic stage 204 and/or an input of logic gate 214. Additionally or alternatively, the output of shadow latch 212 is electrically and/or communicatively coupled to another input of logic gate 214 and/or an input of MUX 210, and the output of logic gate 214 is electrically and/or communicatively coupled to a selector of MUX 210 and/or an input of logic gate 216.

Continuing with this example, an output of logic stage 202 is electrically and/or communicatively coupled to another input of MUX 210. In one example, an oscillating signal 220 is fed and/or delivered to the clock input of main flip-flop 208, and an oscillating signal 222 is fed and/or delivered to the clock input of shadow latch 212. In this example, oscillating signal 220 can constitute and/or represent a reference signal, and oscillating signal 222 can constitute and/or represent a delayed signal relative to the reference signal. Accordingly, oscillating signals 220 and 222 can exhibit and/or demonstrate the same frequency as one another, but oscillating signals 220 and 222 can also be phase-shifted relative to one another.

In some examples, an output of logic stage 202 can also be electrically and/or communicatively coupled to one or more additional razor flip-flops that are not necessarily labelled in FIG. 2. Similarly, an output of one or more of those additional razor flip-flops can be electrically and/or communicatively coupled to logic stage 204. Additionally or alternatively, an output of one or more of those additional razor flip-flops can be electrically and/or communicatively coupled to another input of logic gate 216. In one example, the output of logic gate 214 indicates and/or suggests whether a timing error has occurred within razor flip-flop 206. In this example, the output of logic gate 216 indicates and/or suggests whether a timing error has occurred across any of the razor flip-flops included and/or implemented in circuit 102(1). In certain implementations, logic gate 216 constitutes and/or represents an OR gate, and/or logic gate 214 constitutes and/or represents an exclusive OR (XOR) gate.

In some examples, system management unit 104 is electrically and/or communicatively coupled to an output of razor flip-flop 206 (e.g., the output of logic gate 214) and/or the output of logic gate 216. In one example, system management unit 104 can detect a data corruption event indicative of a potentially faulty voltage-to-frequency ratio based at least in part on doubling sampling data in circuits 102(1)-(N) via in-situ monitors 106(1)-(N). In this example, in-situ monitors 106(1)-(N) can sample data traversing circuits 102(1)-(N) at a plurality of different nodes within circuits 102(1)-(N). In-situ monitors 106(1)-(N) can then compare the data sampled at one of the nodes with the data sampled at another one of the nodes. The result of such a comparison can indicate whether a clock delay indicative of a timing error has occurred. In certain implementations, this double sampling can be performed by capturing the data with clock signals that are out of phase and/or out of synchronization with one another.

In some examples, circuit 102(1) can gate the clocks in razor flip-flop 206 in a hierarchy to increasingly check the degree of timing error that has occurred. In one example, if the smallest phase-shift to the clock renders a timing error, circuit 102(1) can bypass and/or refuse to check for timing errors using delayed clocks with greater phase-shifts. Additionally or alternatively, circuit 102(1) and/or razor flip-flop 206 can delay the data on the data pin and/or line of main flip-flop 208 to achieve similar detection of timing errors while adding an increased capacitance load to the data pin and/or line.

As a specific example, razor flip-flop 206 samples data incoming from logic stage 202 at the output of MUX 210 and at the output of main flip-flop 208, which is clocked via oscillating signal 220. In this example, the data sampled at the output of MUX 210 is clocked at shadow latch 212 via oscillating signal 222, and then the output of shadow latch 212 is XORed with the output of main flip-flop 208. This XORing of the output of shadow latch 212 and the output of main flip-flop 208 can constitute and/or represent a double-sampling comparison that indicates whether a clock delay indicative of a timing error has occurred. For example, such a clock delay can indicate and/or represent a timing error that causes data corruption events within a circuit being monitored.

In some examples, system management unit 104 collects and/or records the operating conditions indicated by the outputs of in-situ monitors in response to detecting a clock delay and/or timing error. In such examples, these operating conditions can constitute and/or represent telemetry data with which system management unit 104 makes AVFS decisions and/or adjustments. For example, system management unit 104 can adjust, modify, and/or change a potentially faulty voltage-to-frequency ratio based at least in part on one or more operating conditions recorded in response to detecting a clock delay and/or timing error. Some of the operating conditions that system management unit 104 can use to decide whether to make an AVFS adjustment include voltage levels, clock frequencies, temperatures, and/or the number of timing errors experienced by the circuit undergoing the AVFS adjustment. In one example, those operating conditions constitute and/or represent the state of the circuit when a timing error occurred and/or is flagged in the circuit.

In some examples, system management unit 104 can maintain and/or provide granular and/or individual control over the AVFS of circuits 102(1)-(N). For example, in response to the detection of a potentially faulty voltage-to-frequency ratio and/or one or more data corruption events in circuit 102(1), system management unit 104 can modify the voltage-to-frequency ratio of circuit 102(1) but maintain the voltage-to-frequency ratio of circuit 102(N) intact without any adjustment. Similarly, in response to the detection of a potentially faulty voltage-to-frequency ratio and/or one or more data corruption events in circuit 102(N), system management unit 104 can modify the voltage-to-frequency ratio of circuit 102(N) but maintain the voltage-to-frequency ratio of circuit 102(1) intact without any adjustment.

In some examples, system management unit 104 tolerates and/or allows a certain number of data corruption events to occur before modifying and/or adjusting the AVFS of the corresponding circuit. For example, system management unit 104 can be programmed and/or configured to tolerate and/or allow a single instance of silent data corruption in circuit 102(1) before modifying and/or adjusting the voltage-to-frequency ratio of circuit 102(1). In this example, if system management unit 104 detects multiple data corruption events in connection with circuit 102(1), system management unit 104 modifies and/or adjusts the voltage-to-frequency ratio of circuit 102(1) in response to the detection of those data corruption events. In certain implementations, system management unit 104 may use a tolerated data corruption event as a trigger to initiate an architectural replay of the workload that led to the data corruption event.

In some examples, the detection and/or mitigation of silent data corruptions can be performed on computing device 100 a-priori (e.g., predictively based on telemetry data and/or lab simulations). For example, a quality-control evaluation can involve performing a calibration process on computing device 100 prior to the shipment and/or delivery of computing device 100 to a customer. During this calibration process, computing device 100 and/or an external calibration tool can perform simulations (e.g., Monte Carlo simulations) of timing delays and/or errors across circuits 102(1)-(N). In this example, the simulations can represent, compensate for, and/or account for voltage, frequency, and/or process variations across circuits 102(1)-(N).

In some examples, system management unit 104 and/or the external calibration tool can winnow down and/or select a set of voltage-to-frequency curves (e.g., predefined curves) based at least in part on the timing delay distribution across circuits 102(1)-(N) during the simulations. Continuing with the calibration, system management unit 104 and/or the external calibration tool can collect telemetry data about the operating conditions (e.g., workload-specific voltage droops, destabilizing temperature gradients, etc.) of circuits 102(1)-(N) from in-situ monitors 106(1)-(N). System management unit 104 and/or the external calibration tool can evaluate and/or analyze the telemetry data to determine whether to update the voltage-to-frequency curve applied to one or more of circuits 102(1)-(N) to improve performance and/or dependability. For example, system management unit 104 derate and/or reduce the voltage-to-frequency curve applied to one or more of circuits 102(1)-(N) if the simulations and/or telemetry data suggest that such circuits are too susceptible to silent data corruptions.

Figure 3:
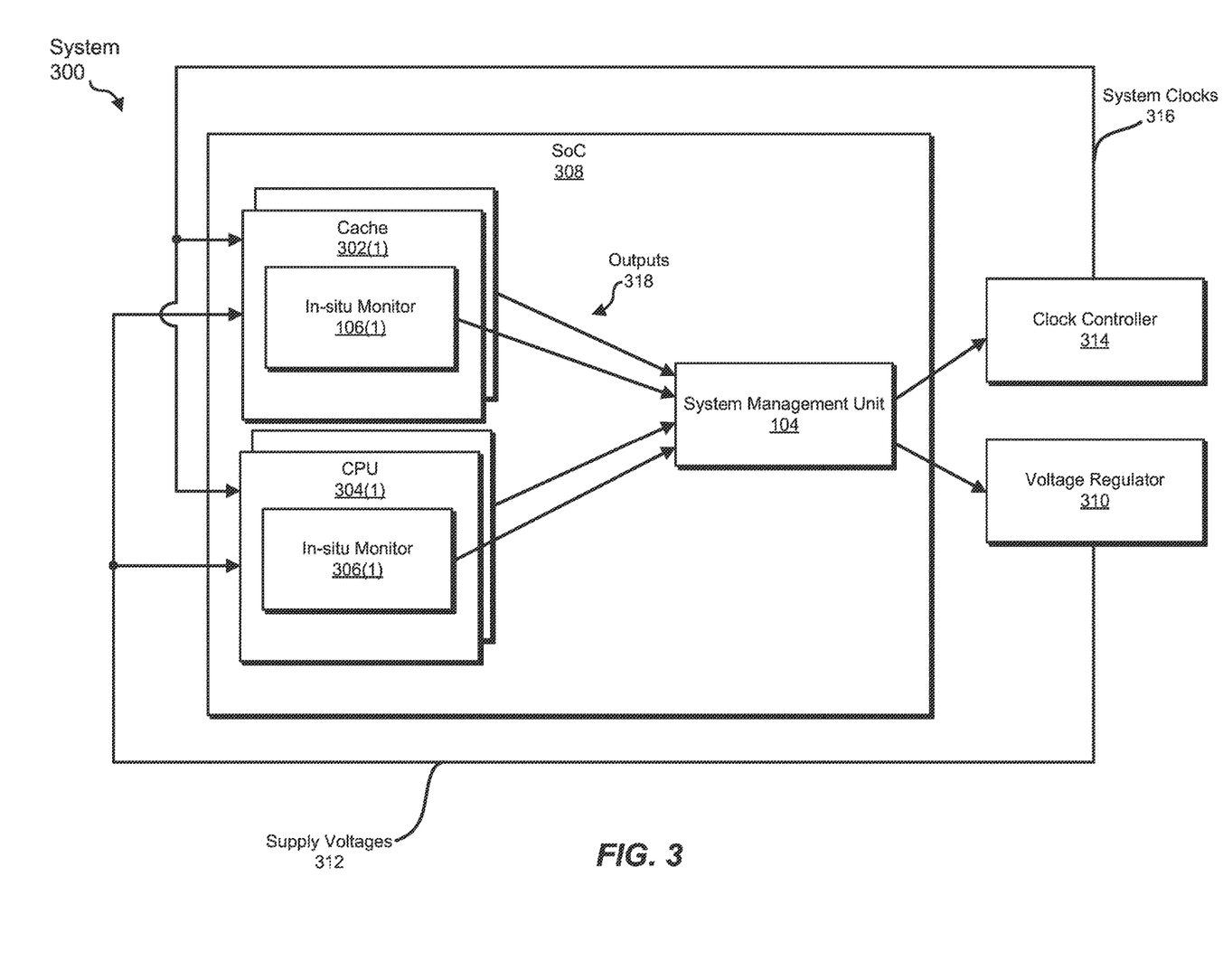
FIG. 3 is a block diagram of an exemplary system capable of detecting and/or mitigating silent data corruptions via AVFS according to one or more implementations of this disclosure.

FIG. 3 illustrates an exemplary system 300 capable of detecting and/or mitigating silent data corruptions via AVFS. As illustrated in FIG. 3, exemplary system 300 includes and/or represents an SoC 308 equipped with a set of caches (e.g., a cache 302(1)), a set of CPUs (e.g., a CPU 304(1)), and/or system management unit 104. In some examples, system 300 can include and/or represent certain components and/or features that perform and/or provide functionalities that are similar and/or identical to those described above in connection with either FIG. 1 or FIG. 2. In one example, SoC 308 can constitute and/or represent an exemplary implementation of computing device 100 in FIG. 1, and the sets of caches and/or CPUs can constitute and/or represent an exemplary implementation of circuits 102(1)-(N) in FIG. 1.

In some examples, each of the caches and/or CPUs are electrically and/or communicatively coupled to system management unit 104 within SoC 308. In one example, system 300 also includes and/or represents a clock controller 314 and/or a voltage regulator 310 that are each electrically and/or communicatively coupled to system management unit 104 of SoC 308. Although illustrated as being external to SoC 308 in FIG. 3, clock controller 314 and/or voltage regulator 310 can alternatively constitute and/or represent part of and/or be included in SoC 308.

In some examples, clock controller 314 can generate, control, and/or provide one or more system clocks 316 that are fed to and/or used by one or more of the caches and/or CPUs in SoC 308. For example, clock controller 314 can control, set, and/or define the frequency of one or more of system clocks 316 fed to and/or used by one or more of the caches and/or CPUs in SoC 308. Additionally or alternatively, voltage regulator 310 can generate, control, and/or provide one or more supply voltages 312 that are fed to and/or used by one or more of the caches and/or CPUs in SoC 308. For example, voltage regulator 310 can control, set, and/or define the voltage level of one or more of supply voltages 312 used to power one or more of the caches and/or CPUs in SoC 308.

In some examples, the caches and/or CPUs can be equipped with in-situ monitors. For example, cache 302(1) can implement and/or include an in-situ monitor 106(1), and/or CPU 304(1) can implement and/or include an in-situ monitor 306(1). In one example, the in-situ monitors have and/or provide outputs 318 that are electrically and/or communicatively coupled to system management unit 104. In this example, outputs 318 provide and/or communicate data indicative of the operating conditions sensed, monitored, and/or detected in the caches and/or CPUs.

In some examples, system management unit 104 can increase and/or increment one or more of supply voltages 312 via voltage regulator 310. Additionally or alternatively, system management unit 104 can decrease and/or decrement the frequency of one or more of system clocks 316 via clock controller 314. By doing so, system management unit 104 can stabilize and/or optimize the performance and/or power consumption of SoC 308 to avoid silent data corruptions without compromising the dependability and/or reliability of SoC 308.

Various implementations of the concepts and/or features described herein can be deployed in a computing device. In a first implementation, a computing device with a self-healing AVFS system that tolerates a single silent data corruption can extrapolate silent data corruptions via error flagging and/or by detecting clock delays in select critical paths. In a second implementation, a computing device with a self-healing AVFS system that tolerates a single silent data corruption can extrapolate silent data corruptions via error flagging alone. In a third implementation, a computing device with an AVFS system can be programmed and/or configured to adjust the voltage-to-frequency ratio a-priori based on telemetry data collected from critical path simulations performed during a calibration process. In a fourth implementation, a computing device with an AVFS system can be programmed and/or configured to compensate the voltage-to-frequency ratio based on telemetry data collected during a calibration process and/or based on runtime delay monitors implemented in auxiliary paths that simulate critical CPU paths without error flagging.

Figure 4:
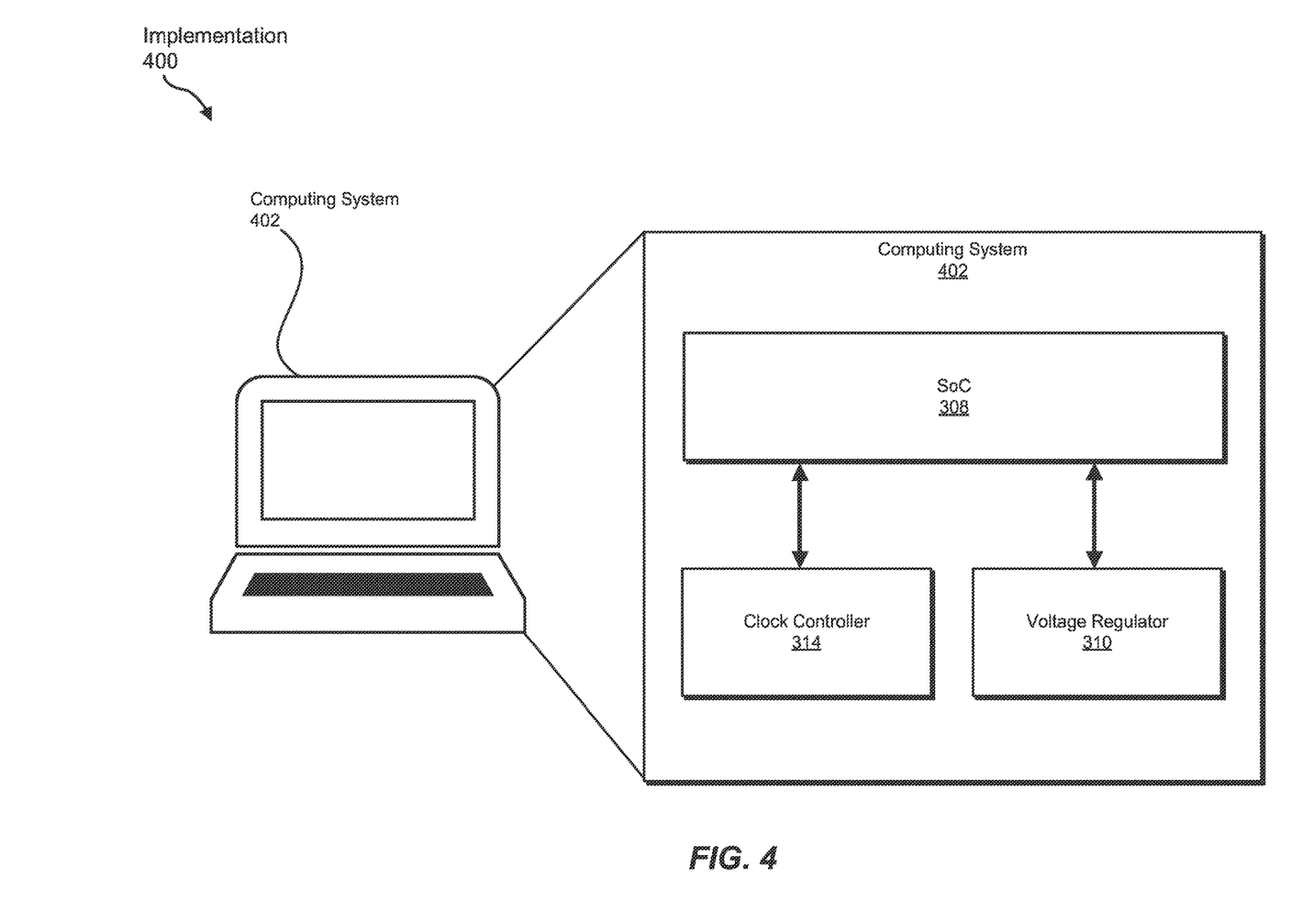
FIG. 4 is an illustration of an exemplary implementation of a computing system that includes a System on a Chip (SoC) capable of detecting and/or mitigating silent data corruptions via AVFS according to one or more implementations of this disclosure.

FIG. 4 illustrates an exemplary implementation 400 involving a computing system 402. As illustrated in exemplary implementation 400 in FIG. 4, computing system 402 includes and/or represents SoC 308 electrically and/or communicatively coupled to clock controller 314 and/or voltage regulator 310. In some examples, computing system 402 can include and/or represent certain components and/or features that perform and/or provide functionalities that are similar and/or identical to those described above in connection with any of FIGS. 1-3. Although illustrated as being external to SoC 308 in FIG. 4, clock controller 314 and/or voltage regulator 310 can alternatively constitute and/or represent part of and/or be included in SoC 308.

In some examples, the various apparatuses, devices, and/or systems described in connection with FIGS. 1-4 can include and/or represent one or more additional circuits, components, devices, and/or features that are not necessarily illustrated and/or labeled in FIGS. 1-4. For example, computing device 100 can also include and/or represent additional analog and/or digital circuitry, onboard logic, transistors, resistors, capacitors, diodes, inductors, switches, registers, flip-flops, connections, traces, buses, semiconductor (e.g., silicon) devices and/or structures, processing devices, storage devices, circuit boards, packages, substrates, housings, combinations or variations of one or more of the same, and/or any other suitable components that facilitate and/or support detecting and/or mitigating silent data corruptions via AVFS. In certain implementations, one or more of these additional circuits, components, devices, and/or features can be inserted and/or applied between any of the existing circuits, components, and/or devices illustrated in FIGS. 1-4 consistent with the aims and/or objectives provided herein. Accordingly, the communicative and/or electrical couplings described with reference to FIGS. 1-4 can be direct connections with no intermediate components, devices, and/or nodes or indirect connections with one or more intermediate components, devices, and/or nodes.

In some examples, the phrase "to couple" and/or the term "coupling", as used herein, can refer to a direct connection and/or an indirect connection. For example, a direct electrical coupling between two components can constitute and/or represent a coupling in which those two components are directly connected to each other by a single node that provides electrical continuity from one of those two components to the other. In other words, the direct coupling can exclude and/or omit any additional components between those two components.

Additionally or alternatively, an indirect electrical coupling between two components can constitute and/or represent a coupling in which those two components are indirectly connected to each other by multiple nodes that fail to provide electrical continuity from one of those two components to the other. In other words, the indirect coupling can include and/or incorporate at least one additional component between those two components.

Figure 5:
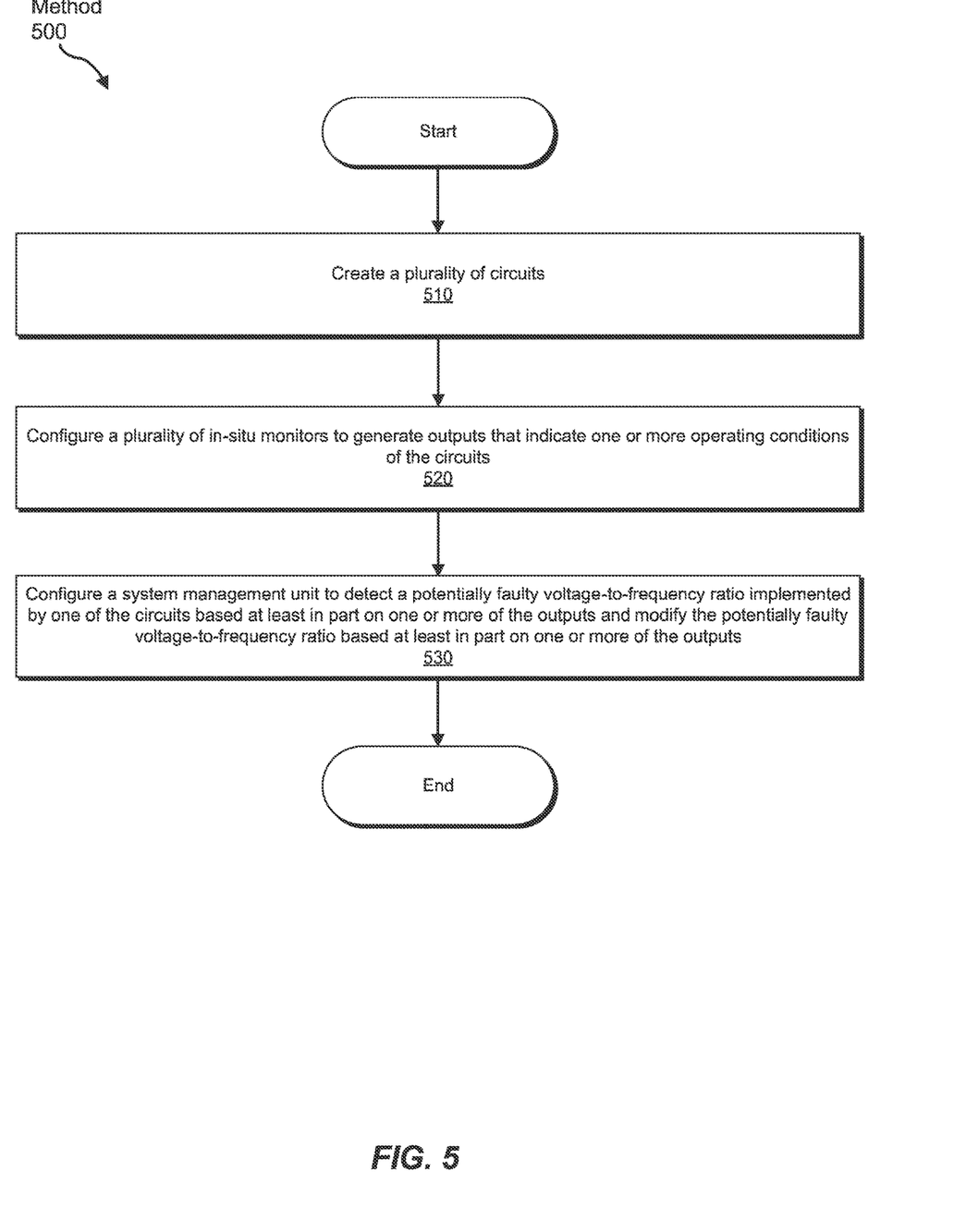
FIG. 5 is a flowchart of an exemplary method for detecting and/or mitigating silent data corruptions via AVFS according to one or more implementations of this disclosure.

FIG. 5 is a flow diagram of an exemplary method 500 for detecting and mitigating silent data corruptions via AVFS. In one example, the steps shown in FIG. 5 can be performed and/or executed during the manufacture and/or assembly of a computing device capable of detecting and/or mitigating silent data corruptions via AVFS. Additionally or alternatively, the steps shown in FIG. 5 can also incorporate and/or involve various sub-steps and/or variations consistent with the descriptions provided above in connection with FIGS. 1-4.

As illustrated in FIG. 5, exemplary method 500 include and/or involve the step of creating a plurality of circuits (510). Step 510 can be performed in a variety of ways, including any of those described above in connection with FIGS. 1-4. For example, a computing device manufacturer and/or subcontractor can create and/or produce a plurality of circuits via any of a variety of fabrication processes. Examples of such fabrication processes include, without limitation, lithography, etching, deposition, chemical mechanical planarization, oxidation, ion implantation, photolithography, diffusion, combinations or variations of one or more of the same, and/or any other suitable fabrication processes.

Exemplary method 500 also includes the step of configuring a plurality of in-situ monitors to generate outputs that indicate one or more operating conditions of the circuits (520). Step 520 can be performed in a variety of ways, including any of those described above in connection with FIGS. 1-4. For example, the computing device manufacturer and/or subcontractor can configure and/or implement a plurality of in-situ monitors to generate outputs that indicate one or more operating conditions of the circuits.

Exemplary method 500 further includes the step of configuring a system management unit to detect a potentially faulty voltage-to-frequency ratio implemented by one of the circuits based at least in part on one or more of the outputs and modify the potentially faulty voltage-to-frequency based at least in part on one or more of the outputs (530). Step 530 can be performed in a variety of ways, including any of those described above in connection with FIGS. 1-4. For example, the computing device manufacturer and/or subcontractor can configure and/or implement a system management unit to detect a potentially faulty voltage-to-frequency ratio implemented by one of the circuits based at least in part on one or more of the outputs and modify the potentially faulty voltage-to-frequency based at least in part on one or more of the outputs.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality. Furthermore, the various steps, events, and/or features performed by such components should be considered exemplary in nature since many alternatives and/or variations can be implemented to achieve the same functionality within the scope of this disclosure.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the instant disclosure. The implementations disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device comprising:
   a monitor configured to generate an output that indicates one or more operating conditions of a circuit; and
   a system management unit configured to:
      detect a potentially faulty voltage-to-frequency ratio implemented by the circuit based at least in part on the output; and
      modify the potentially faulty voltage-to-frequency ratio based at least in part on the output.

2. The computing device of claim 1, wherein the operating conditions indicated by the output comprise at least one of:
   a voltage level of the circuit;
   a frequency of an oscillating signal used by the circuit;
   a temperature of the circuit; or
   a potential timing error experienced by the circuit.

3. The computing device of claim 1, wherein the circuit comprises at least one of:
   a processor core; or
   a memory device.

4. The computing device of claim 1, wherein the monitor is positioned to monitor at least one of:
   a critical path of the circuit;
   an auxiliary path that simulates a critical path of the circuit;
   a power supply voltage of the circuit;
   a temperature of the circuit;
   a frequency of an oscillating signal used by the circuit; or
   a potential timing error experienced by the circuit.

5. The computing device of claim 1, wherein the system management unit is further configured to detect a data corruption event indicative of the potentially faulty voltage-to-frequency ratio by:
   sampling data traversing the circuit at a plurality of nodes within the circuit; and
   comparing the data sampled at one of the nodes with the data sampled at another one of the nodes.

6. The computing device of claim 5, wherein the system management unit is further configured to detect a clock delay indicative of a timing error that causes the data corruption event by sampling the data with both a reference oscillating signal and a delayed oscillating signal.

7. The computing device of claim 6, wherein the system management unit is further configured to:
   record the operating conditions indicated by the output in response to detecting the clock delay; and
   modify the potentially faulty voltage-to-frequency ratio based at least in part on one or more of the operating conditions recorded in response to detecting the clock delay.

8. The computing device of claim 7, wherein the operating conditions recorded in response to detecting the clock delay represent a state of the circuit when the timing error occurred.

9. The computing device of claim 1, wherein the monitor comprises a razor flip-flop incorporated in the circuit, the razor flip-flop generates an output indicative of whether the circuit experiences a timing error.

10. The computing device of claim 1, wherein the system management unit is further configured to:
    increase a voltage level of the circuit; or
    decrease a frequency of an oscillating signal used by the circuit.

11. The computing device of claim 1, wherein the system management unit is further configured to maintain another voltage-to-frequency ratio implemented by another circuit despite modifying the potentially faulty voltage-to-frequency ratio.

12. The computing device of claim 1, wherein the system management unit is further configured to:
    analyze the output; and
    predict that the voltage-to-frequency ratio is potentially faulty based at least in part on the analysis of the output.

13. The computing device of claim 1, wherein the system management unit is further configured to:
    tolerate at least one data corruption event before modifying the potentially faulty voltage-to-frequency ratio;
    detect a plurality of data corruption events in connection with the circuit; and
    modify the potentially faulty voltage-to-frequency ratio in response to detecting the plurality of data corruption events.

14. The computing device of claim 1, wherein the system management unit is further configured to:
    detect another potentially faulty voltage-to-frequency ratio implemented by another circuit based at least in part another output that indicates one or more operating conditions of the another circuit; and
    modify the another potentially faulty voltage-to-frequency ratio based at least in part on the another output.

15. A system comprising:
    a computing device; and
    a processor incorporated in the computing device, the processor comprising:
       a monitor configured to generate an output that indicates one or more operating conditions of a circuit; and
       a system management unit configured to:
          detect a potentially faulty voltage-to-frequency ratio implemented by the circuit based at least in part on the output; and
          modify the potentially faulty voltage-to-frequency ratio based at least in part on one the output.

16. The system of claim 15, wherein the operating conditions indicated by the output comprise at least one of:
    a voltage level of the circuit;
    a frequency of an oscillating signal used by the circuit;
    a temperature of the circuit; or
    a potential timing error experienced by the circuit.

17. The system of claim 15, wherein the circuit comprises at least one of:
    a processor core; or
    a memory device.

18. The system of claim 15, wherein one of the monitor is positioned to monitor:
- a critical path of the circuit;
- an auxiliary path that simulates a critical path of the circuit;
- a power supply voltage of the circuit;
- a temperature of the circuit;
- a frequency of an oscillating signal used by the circuit; or
- a potential timing error experienced by the circuit.

19. The system of claim 15, wherein the system management unit is further configured to detect a data corruption event indicative of the potentially faulty voltage-to-frequency ratio by:
- sampling data traversing the circuit at a plurality of nodes within the circuit; and
- comparing the data sampled at one of the nodes with the data sampled at another one of the nodes.

20. A method comprising:
- creating a circuit;
- configuring a monitor to generate an output that indicates one or more operating conditions of the circuit; and
- configuring a system management unit to:
  - detect a potentially faulty voltage-to-frequency ratio implemented by the circuit based at least in part on the output; and
  - modify the potentially faulty voltage-to-frequency ratio based at least in part on the output.

* * * * *